(12) United States Patent
Planque et al.

(10) Patent No.: US 11,335,934 B2
(45) Date of Patent: May 17, 2022

(54) ASSEMBLY COMPRISING A SOEC/SOFC-TYPE SOLID OXIDE STACK AND A CLAMPING SYSTEM WITH AN INTEGRATED GAS SUPERHEATING SYSTEM

(71) Applicant: COMMISSARIAT À L'ÉNERGIE ATOMIQUE ET AUX ÉNERGIES ALTERNATIVES, Paris (FR)

(72) Inventors: Michel Planque, Seyssins (FR); Charlotte Bernard, Contamine sure Arve (FR); Guilhem Roux, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 214 days.

(21) Appl. No.: 16/758,176

(22) PCT Filed: Oct. 26, 2018

(86) PCT No.: PCT/FR2018/052663
§ 371 (c)(1),
(2) Date: Apr. 22, 2020

(87) PCT Pub. No.: WO2019/081866
PCT Pub. Date: May 2, 2019

(65) Prior Publication Data
US 2020/0313217 A1    Oct. 1, 2020

(30) Foreign Application Priority Data
Oct. 26, 2017   (FR) ..................................... 1760114

(51) Int. Cl.
*H01M 8/12*    (2016.01)
*H01M 8/04007*    (2016.01)
(Continued)

(52) U.S. Cl.
CPC .......... *H01M 8/12* (2013.01); *H01M 8/04074* (2013.01); *H01M 8/2425* (2013.01); *H01M 8/248* (2013.01); *H01M 2008/1293* (2013.01)

(58) Field of Classification Search
CPC .. H01M 8/12; H01M 8/04074; H01M 8/2425; H01M 8/248; H01M 2008/1293
See application file for complete search history.

(56) References Cited

U.S. PATENT DOCUMENTS

2012/0325654 A1    12/2012   Gilo et al.
2016/0181649 A1    6/2016    Denzler
(Continued)

FOREIGN PATENT DOCUMENTS

EP    1705741 A1    9/2006
EP    3035430 A1    6/2016
(Continued)

OTHER PUBLICATIONS

U.S. Appl. No. 16/333,299 entitled "System for High-Temperature Reversible Electrolysis of Water Comprising a Hydride Tank Coupled with the Electrolyser", filed Mar. 14, 2019.
(Continued)

*Primary Examiner* — Stewart A Fraser
(74) *Attorney, Agent, or Firm* — Pearne & Gordon LLP (57) ABSTRACT

An assembly comprising a SOEC/SOFC-type solid oxide stack, and a clamping system for the stack. The assembly further comprises a system for superheating the gases at the inlet of the stack, comprising: a heating plate integrated within the thickness of at least one of the upper and lower clamping plates of the clamping system; an upper or lower end plate for superheating the gases, comprising a circuit through which the gases to be heated flow; and an inlet duct for the gases to be heated.

10 Claims, 5 Drawing Sheets

(51) Int. Cl.
*H01M 8/2425* (2016.01)
*H01M 8/248* (2016.01)

(56) References Cited

U.S. PATENT DOCUMENTS

2019/0013539 A1* 1/2019 Reytier ................ C25B 11/036
2019/0326621 A1 10/2019 Planque et al.
2019/0372137 A1 12/2019 Planque et al.

FOREIGN PATENT DOCUMENTS

| FR | 3045215 A1 | 6/2017 |
|----|------------|--------|
| WO | 2004077587 A2 | 9/2004 |
| WO | 2005060028 A2 | 6/2005 |

OTHER PUBLICATIONS

International Search Report for PCT/FR2018/052663 dated Jan. 2, 2019.
Written Opinion for PCT/FR2018/052663 dated Jan. 2, 2019.
Search report for French Application No. FR1760114 dated Apr. 16, 2018.

* cited by examiner

ASSEMBLY COMPRISING A SOEC/SOFC-TYPE SOLID OXIDE STACK AND A CLAMPING SYSTEM WITH AN INTEGRATED GAS SUPERHEATING SYSTEM

CROSS-REFERENCE TO RELATED APPLICATIONS

This is a National Stage application of PCT international application PCT/FR2018/052663, filed on Oct. 26, 2018, which claims the priority of French Patent Application No. 1760114, filed Oct. 26, 2017, both of which are incorporated herein by reference in their entirety.

TECHNICAL FIELD

The present invention relates to the general field of high-temperature electrolysis (HTE), in particular high-temperature steam electrolysis (HTSE), carbon dioxide ($CO_2$) electrolysis, or indeed high-temperature co-electrolysis of water (HTE) with carbon dioxide ($CO_2$).

More specifically, the invention relates to the field of solid oxide electrolyser cells, generally designated using the acronym SOEC.

It also relates to the field of solid oxide fuel cells, generally designated using the acronym SOFC.

Thus, more generally, the invention relates to the field of SOEC/SOFC-type solid oxide stacks operating at high temperature.

More specifically, the invention relates to an assembly comprising a SOEC/SOFC-type solid oxide stack and a system for clamping the stack with an integrated gas superheating system at the input of the stack, as well as a method for manufacturing such a gas superheating system.

STATE OF THE RELATED ART

In the context of a SOEC-type high-temperature solid oxide electrolyser cell, it is necessary to convert by means of an electric current, in the same electrochemical device, steam ($H_2O$) into dihydrogen ($H_2$) and dioxygen ($O_2$), and/or convert carbon dioxide ($CO_2$) into carbon monoxide (CO) and dioxygen ($O_2$). In the context of a SOFC-type high-temperature solid oxide fuel cell, the operation is reversed to produce an electric current and heat while being supplied with dihydrogen ($H_2$) and dioxygen ($O_2$), typically with air and natural gas, namely with methane ($CH_4$). For the purposes of simplicity, the following description favours the operation of a SOEC-type high-temperature solid oxide electrolyser cell performing water electrolysis. However, this operation is applicable to the electrolysis of carbon dioxide ($CO_2$), or indeed high-temperature co-electrolysis of water (HTE) with carbon dioxide ($CO_2$). Furthermore, this operation is transposable to the case of a SOFC-type high-temperature solid oxide fuel cell.

To carry out water electrolysis, it is advantageous to carry out same at a high temperature, typically between 600 and 1000° C., because it is more advantageous to electrolyse steam than liquid water and because a portion of the energy required for the reaction may be supplied by heat, which is less expensive than electricity.

To carry out high-temperature electrolysis (HTE), a SOEC-type high-temperature solid oxide electrolyser cell consists of a stack of elementary units each including a solid oxide electrolysis cell, or indeed electrochemical cell, consisting of three anode/electrolyte/cathode layers overlaid on one another, and of metal alloy interconnection plates, also known as bipolar plates or interconnectors. Each electrochemical cell is clamped between two interconnection plates. A SOEC-type high-temperature solid oxide electrolyser cell is then an alternating stack of electrochemical cells and interconnectors. A SOFC-type high-temperature solid oxide fuel cell consists of the same type of stack of elementary units. This high-temperature technology being reversible, the same stack can operate in electrolysis mode and produce hydrogen and oxygen from water and electricity, or in fuel cell mode and produce electricity from hydrogen and oxygen.

Each electrochemical cell corresponds to an electrolyte/electrode assembly, which is typically a ceramic multilayer assembly, wherein the electrolyte is formed by a central ion-conducting layer, this layer being solid, dense and leak-tight, and clamped between two porous layers forming the electrodes. It should be noted that there may be additional layers, but which merely serve to enhance the one or more layers described above.

The electrical and fluidic interconnection devices are electron conductors which provide, from an electrical point of view, the connection of each electrochemical elementary unit cell in the stack of elementary units, ensuring electrical contact between one face and the cathode of a cell and between the other face and the anode of the following cell, and from a fluidic point of view, thus combining the production of each of the cells. The interconnectors thus carry out the electric current feed and collection functions and delimit gas circulation compartments, for distribution and/or collection.

More specifically, the main function of the interconnectors is that of providing the flow of electric current but also gas circulation in the vicinity of each cell (i.e. steam injected, hydrogen and oxygen extracted for HTE electrolysis; air and fuel of which hydrogen injected and water extracted for a SOFC cell), and separating the anodic and cathodic compartments of two adjacent cells, which are the gas circulation compartments on the side of the anodes and the cathodes of the cells, respectively.

In particular, for a SOEC-type high-temperature solid oxide electrolyser cell, the cathodic compartment includes steam and hydrogen, produced from the electrochemical reaction, whereas the anodic compartment includes a draining gas, if present, and oxygen, another product of the electrochemical reaction. For a SOFC-type high-temperature solid oxide fuel cell, the anodic compartment includes the fuel, whereas the cathodic compartment includes the oxidant.

To carry out high-temperature steam electrolysis (HTE), steam ($H_2O$) is injected into the cathodic compartment. Under the effect of the electric current applied to the cell, the water molecules in vapour form are separated at the interface between the hydrogen electrode (cathode) and the electrolyte: this separation produces dihydrogen gas ($H_2$) and oxygen ions ($O^{2-}$). Dihydrogen ($H_2$) is collected and discharged at the hydrogen compartment output. The oxygen ions ($O^{2-}$) migrate through the electrolyte and are recombined into dioxygen ($O_2$) at the interface between the electrolyte and the oxygen electrode (anode). A draining gas, such as air, can circulate at the level of the anode and thus collect the oxygen generated in gaseous form at the anode.

To perform the operation of a solid oxide fuel cell (SOFC), air (oxygen) is injected into the cathodic compartment of the cell and hydrogen into the anodic compartment. The oxygen from the air will be separated into $O^{2-}$ ions. These ions will migrate in the electrolyte from the cathode to the anode to oxidise the hydrogen and form water with simultaneous electricity production. In a SOFC cell, as in SOEC electrolysis, the steam is situated in the dihydrogen ($H_2$) compartment. Only the polarity is inverted.

Figure 1:
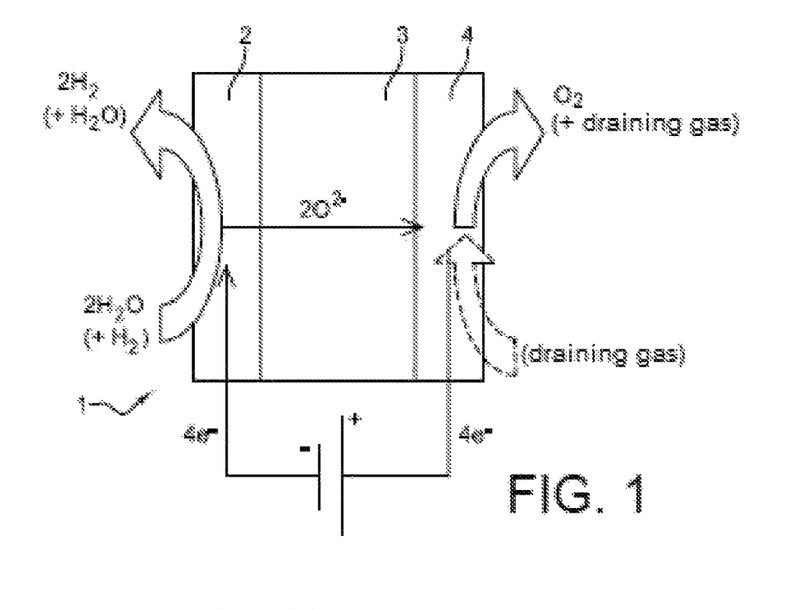
FIG. 1 is a schematic view showing the operating principle of a high-temperature solid oxide electrolyser cell (SOEC)

By way of illustration, FIG. 1 represents a schematic view showing the operating principle of a SOEC-type high-temperature solid oxide electrolyser cell. The function of such an electrolyser is that of converting steam into hydrogen and oxygen according to the following electrochemical reaction:

$$2H_2O \rightarrow 2H_2 + O_2.$$

This reaction is carried out electrochemically in the cells of the electrolyser. As represented schematically in FIG. 1, each elementary electrolysis cell 1 is formed of a cathode 2 and an anode 4, placed on either side of a solid electrolyte 3. The two electrodes (cathode and anode) 2 and 4 are electron and/or ion conductors, made of porous material, and the electrolyte 3 is gas-tight, electronically insulating and ionically conducting. The electrolyte 3 may in particular be an anion conductor, more specifically an $O^{2-}$ ion anion conductor and the electrolyser is then referred to as an anion electrolyser, as opposed to proton electrolytes (H+).

The electrochemical reactions are carried out at the interface between each of the electron conductors and the ion conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3, inserted between the two electrodes 2 and 4, is the migration site of the $O^{2-}$ ions under the effect of the electric field created by the difference in potential applied between the anode 4 and the cathode 2.

As illustrated between brackets in FIG. 1, the steam at the cathode input may be accompanied by hydrogen $H_2$ and the hydrogen produced and recovered at the output may be accompanied by steam. Similarly, as illustrated with dotted lines, a draining gas, such as air, may further be injected at the input to discharge the oxygen produced. Injecting a draining gas has the additional function of acting as a thermal regulator.

An elementary electrolyser, or electrolytic reactor, consists of an elementary cell as described above, with a cathode 2, an electrolyte 3, and an anode 4, and two interconnectors which perform electrical, hydraulic and thermal functions.

To increase the hydrogen and oxygen flow rates produced, it is known to stack several elementary electrolytic cells on one another, separating them with interconnectors. The assembly is positioned between two end interconnection plates which support the electrical power supplies and the gas supplies of the electrolyser (electrolytic reactor).

A SOEC-type high-temperature solid oxide electrolyser cell thus comprises at least one, generally a plurality of electrolysis cells stacked on one another, each elementary cell being formed of an electrolyte, a cathode and an anode, the electrolyte being inserted between the anode and the cathode.

As stated above, the fluidic and electrical interconnection devices which are in electrical contact with one or more electrodes generally perform electric current feed and collection functions and delimit one or more gas circulation compartments.

Thus, the function of the so-called cathodic compartment is that of electric current and steam distribution as well as the recovery of hydrogen at the cathode in contact.

The function of the so-called anodic compartment is that of electric current distribution as well as the recovery of oxygen produced at the anode in contact, optionally using a draining gas.

Figure 2:
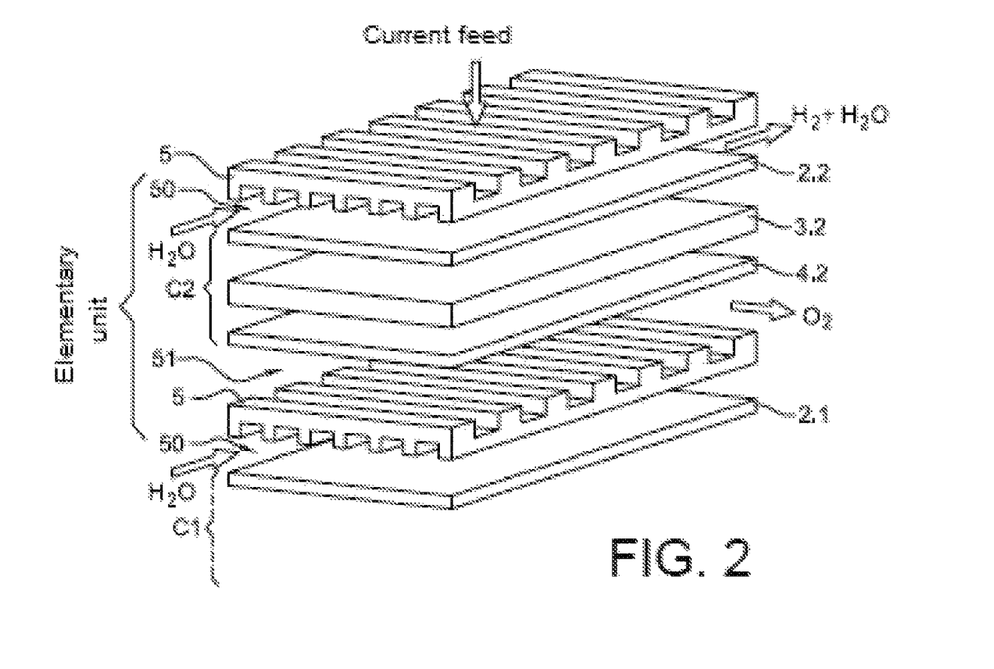
FIG. 2 is an exploded schematic view of a part of a high-temperature solid oxide electrolyser cell (SOEC) comprising interconnectors according to the prior art.

FIG. 2 represents an exploded view of elementary units of a SOEC-type high-temperature solid oxide electrolyser cell according to the prior art. This electrolyser cell includes a plurality of elementary electrolytic cells C1, C2, of solid oxide type (SOEC), alternately stacked with interconnectors 5. Each cell C1, C2 consists of a cathode 2.1, 2.2 and an anode (only the anode 4.2 of the cell C2 is shown), between which an electrolyte is disposed (only the electrolyte 3.2 of the cell C2 is shown).

The interconnector 5 is a metal alloy component which provides the separation between the cathodic 50 and anodic 51 compartments, defined by the volumes between the interconnector 5 and the adjacent cathode 2.1 and between the interconnector 5 and the adjacent anode 4.2 respectively. It also performs gas distribution to the cells. The injection of steam into each elementary unit is performed in the cathodic compartment 50. The collection of the hydrogen produced and the residual steam at the cathode 2.1, 2.2 is performed in the cathodic compartment 50 downstream from the cell C1, C2 after separation of the steam thereby. The collection of the oxygen produced at the anode 4.2 is performed in the anodic compartment 51 downstream from the cell C1, C2 after separation of the steam thereby. The interconnector 5 provides the current flow between the cells C1 and C2 by direct contact with the adjacent electrodes, i.e. between the anode 4.2 and the cathode 2.1.

The operating conditions of a high-temperature solid oxide electrolyser cell (SOEC) being very similar to those of a solid oxide fuel cell (SOFC), the same technological constraints are encountered.

Thus, the proper operation of such SOEC/SOFC-type solid oxide stacks operating at high temperature essentially requires that the points listed hereinafter be fulfilled.

Firstly, it is necessary to have electric insulation between two successive interconnectors at risk of short-circuiting the electrochemical cell, but also a satisfactory electrical contact and a sufficient contact area between a cell and an interconnector. The lowest possible ohmic resistance is sought between cells and interconnectors.

Moreover, tightness is needed between the anodic and cathodic compartments at risk of having a recombination of the gases produced inducing a decrease in efficiency and above all the appearance of hot spots damaging the stack.

Finally, it is essential to have a satisfactory gas distribution both at the input and at the recovery of the products at risk of loss of efficiency, pressure and temperature inhomogeneity in the different elementary units, or redhibitory degradation of the electrochemical cells.

The incoming and outflowing gases in a high-temperature electrolyser cell (SOEC) or fuel cell (SOFC) stack operating at high temperature may be managed by means of suitable devices of a furnace such as that illustrated with reference to FIG. 3.

The furnace 10 thus includes cold parts PF and hot parts PC, the latter comprising the furnace hearth 11, a looped tube 12 to manage the gas inputs and outputs and the high-temperature electrolyser cell (SOEC) or fuel cell (SOFC) stack 20.

Conventionally, there are two main techniques for carrying out superheating of the input gases in a high-temperature electrolyser cell (SOEC) or fuel cell (SOFC) stack.

Figure 3:
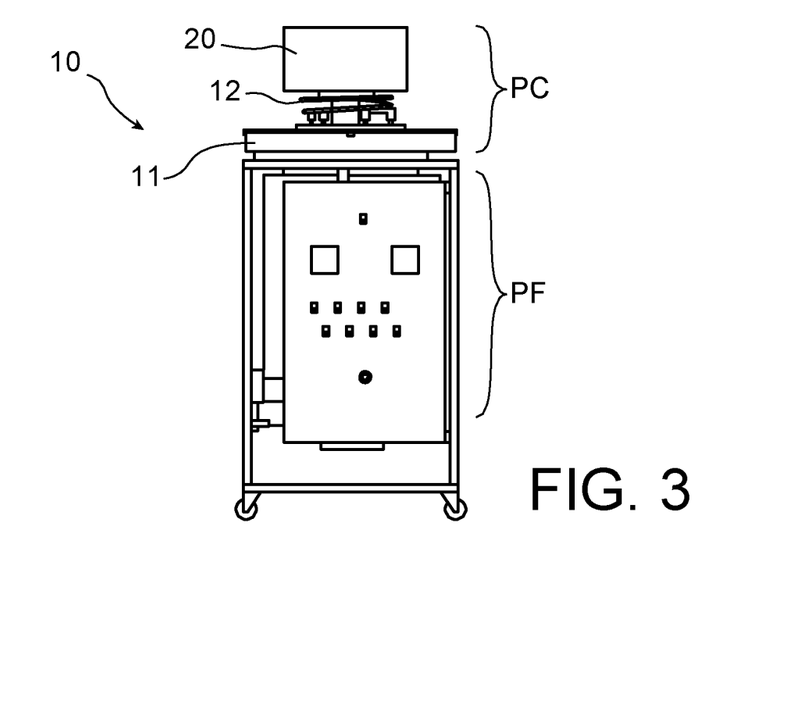
FIG. 3 illustrates the principle of the architecture of a furnace whereon a high-temperature electrolyser cell (SOEC) or fuel cell (SOFC) stack operating at high temperature is placed.

Firstly, as represented schematically by the looped tube 12 in FIG. 3, it is possible to use lengths of tube wound next to the heating resistors of a furnace 10 in the hot part PC. The gases will have previously been brought to a temperature of about 500° C. at the exchanger output if this is envisaged by the system. Then, this or these gas superheating tube(s) 12 make it possible to gain about 300° C. more using the thermal radiation of the resistors of the furnace 10 and the stack 20, before being introduced into the stack 20.

Figure 4:
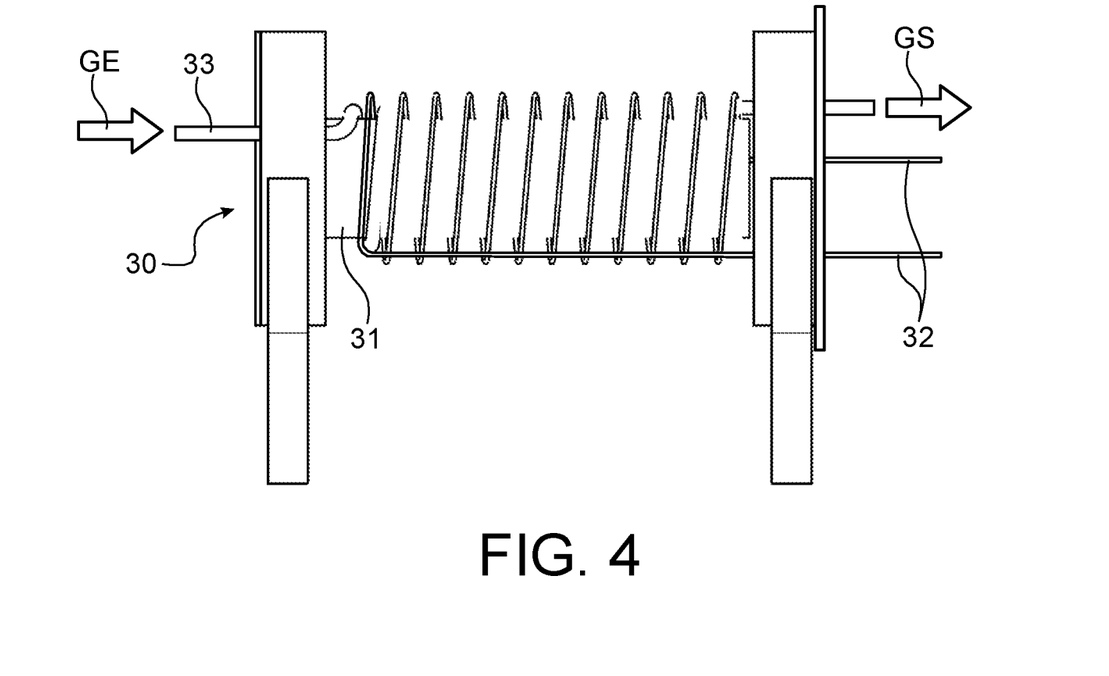
FIG. 4 illustrates the principle of an electric gas heater according to the prior art.

Moreover, it is also known to have the gases pass via electric heaters 30 such as that represented in FIG. 4. Such an electric heater 30 resembles a bulky assembly comprising an inertial mass 31 made of steel, a heating resistor 32 and a gas duct tube 33 wound on the inertial mass 31. In FIG. 4, the incoming gases GE and the outflowing gases GS are also represented. These electric heaters 30 are responsible for bringing the incoming gases GE from 20° C. to a temperature of about 800° C. before introducing the outflowing gases GS into the stack 20.

The proper operation of these two main techniques described above requires a very precise temperature at the input of the stack 20 in order to ensure the proper operation of the assembly.

The first technique which, after passing the gases in the exchangers, recovers the radiation from the furnace resistors to raise the gases to the correct temperature at the stack input therefore requires making windings of a length of about 3 m, which gives rise to the drawback of adding complexity in the bends to be produced to ensure that the tubes arrive at the correct locations in a confined space, and which increases the furnace size significantly. The implementation is therefore complex as it is necessary to be precise and as the tubes, typically of diameter 10/12 made of 316L stainless steel or Inconel 600, are very rigid. Moreover, making gas superheating loops takes up considerable space, and inevitably interferes with the current feeds, the thermocouple passages, and the output tubes of the electrolyser, which frequently leads to these lines being shortened due to the lack of space in the furnace. Furthermore, it is necessary to repeat the same bending work for each new stack, as the disassembly of the connection of these loops is destructive.

As a general rule, in order to obtain the correct temperature at the input of the stack 20, and for an inner diameter of the tube 12 of about 10 mm, a developed length of about 3 m is needed per line of input gas, typically $H_2O$ and $N_2O_2$, with a flow rate between 5 and 15 $Nm^3/s$. This length of about 3 m, which makes it possible to gain about 300° C., works equally well in high-temperature electrolyser cell (SOEC) or fuel cell (SOFC) stack mode, and ensures the correct temperature at the stack input.

Moreover, it is necessary to perform a costly and time-consuming treatment of these gas lines by alumina deposition so as to prevent pollutions due to oxidation when 316L stainless steel is used. These particles (chromium, vanadium, etc.) may bind to this cell, and thus lower the performances of the SOEC/SOFC-type solid oxide stack.

Moreover, the second technique requires a superheater 30 per gas input. However, these are bulky assemblies that take up considerable space, whereas the trend is increasingly towards compact systems. Therefore, there are as many electric superheaters as there are gas inputs, which, in the context of the integration of peripheral elements in a furnace, poses serious problems. Therefore, there is a need to place the gas output of this electric heater 30 as close as possible to the stack inputs so as to prevent tracing of the line per heating arm.

DESCRIPTION OF THE INVENTION

The aim of the invention is that of at least partially remedying the needs mentioned above and the drawbacks relating to the embodiments of the prior art.

It particularly relates to the embodiment of a design of an integrated stack/gas superheating system assembly for a high-temperature electrolyser cell (SOEC) or fuel cell (SOFC) stack, and more specifically to embodying, in the very core of the stack, in the hot part, a compact stack input gas superheating system, without adding thickness. This system must therefore be suitable for being integrated in the stack having a Plug & Play (PnP) type feature, as described in French patent application FR 3 045 215 A1.

The invention thus relates, according to one of the aspects thereof, to an assembly, including:
- a SOEC/SOFC-type solid oxide stack operating at high temperature, including:
  - a plurality of electrochemical cells each formed of a cathode, an anode and an electrolyte inserted between the cathode and the anode, and a plurality of intermediate interconnectors each arranged between two adjacent electrochemical cells,
  - an upper end plate and a lower end plate, between which the plurality of electrochemical cells and the plurality of intermediate interconnectors are clamped,
- a system for clamping the SOEC/SOFC-type solid oxide stack, including an upper clamping plate and a lower clamping plate, between which the SOEC/SOFC-type solid oxide stack is clamped, characterised in that it further includes:
- a system for superheating the input gases of the SOEC/SOFC-type solid oxide stack, including:
  - at least one heating plate integrated in the thickness of at least one of the upper and lower clamping plates suitable for heating the gases to be heated,
  - at least one upper gas superheating end plate, positioned between the upper clamping plate and the SOEC/SOFC-type solid oxide stack, and/or a lower gas superheating end plate, positioned between the lower clamping plate and the SOEC/SOFC-type solid oxide stack, each gas superheating end plate including a gas circulation circuit from a first end, where the gases to be heated arrive, to a second end, where the heated gases are discharged towards the stack,
- at least one input duct of the gases to be heated communicating with the first end of a gas superheating end plate, such that a stream of gas to be heated entering said at least one input duct circulates in the gas circulation system, from the first end to the second end to reach the input of the SOEC/SOFC-type solid oxide stack.

Thanks to the invention, it is possible to do away with tubular windings that are complex to implement, as described above with reference to the first gas superheating technique, by means of an innovative and compact geometry compared to almost 2 metres, or even 3.6 metres, of bent tubes in the chamber of the furnace per gas line. Therefore, a significant gain in terms of dimensions is obtained. This is an integration in the stack as there is no additional part added.

Furthermore, the superheating system according to the invention being part of the stack, it is possible to avoid repeating the tubular windings for each new stack whereas the tubular loop system according to the first technique of the prior art is not recoverable.

Advantageously, the superheating system according to the invention may be reused for other stacks.

Furthermore, it may be easy to place thermocouples at the output of the superheating system according to the invention to ascertain with accuracy the gas input temperature in the stack, whereas for the tubes according to the prior art, this is more complex due to the lack of space and the curved geometries of the windings.

Moreover, the path of the gas in the superheating system according to the invention is facilitated by the sinusoidal geometry allowing satisfactory continuity in the incoming gas stream while limiting head losses.

Furthermore, any alumina deposition treatment is only to be carried out once inside the superheating system to prevent pollutions by evaporation of chromium and other elements.

The superheating system according to the invention may further include one of more of the following features taken in isolation or according to any technically possible combinations.

Preferentially, said at least one heating plate includes a resistor. The electric current may then circulate in the resistor and heat same via the Joule effect. The heat may be modulated by varying the intensity of the electric current. A thermostat may be used for heat and electric current regulation so as to retain a temperature close to that sought.

The resistor may particularly be made of a nickel-chromium alloy, very particularly highly resistive. The resistor may have a spiral shape.

Thus, said at least one heating plate may include a support plate wherein a resistor is integrated. This assembly formed by the support plate and the resistor integrated in the support plate may thus correspond to a heating plate which is integrated in the thickness of at least one of the upper and lower clamping plates. The cavity of the resistor on the support plate may be produced by machining. The heat from the resistor is transmitted to the support plate. This support plate may for example be made of cast iron or of various other materials.

Alternatively, said at least one heating plate may consist of a resistor integrated in the thickness of at least one of the upper and lower clamping plates. In other words, unlike the preceding configuration, said at least one heating plate may be devoid of a support plate wherein a resistor is integrated and solely consist of a resistor. In this case, the integration of a heating plate in resistor form in a clamping plate may be carried out by brazing. The associated clamping plate(s) may for example be made of a 310S stainless steel type alloy. Then, the material of the clamping plate may absorb the heat from the resistor and diffuse same to the surrounding objects.

Alternatively again, instead of a resistor, said at least one heating plate could include one or more heating cartridges inserted into one or more orifices of a support plate integrated in a clamping plate or one or more orifices formed in the clamping plate, without using a support plate. To facilitate the installation thereof, these heating cartridges would have a slightly smaller size than the nominal diameter thereof.

Moreover, the lower and/or upper clamping plate(s) may be made of austenitic chromium-nickel stainless steel, in particular of an AISI 310 type austenitic steel, with a high resistance to high temperatures. Alternatively again, they may be made of a nickel-chromium alloy, particularly Inconel 600 type, with a satisfactory resistance to oxidation and to high temperatures.

The gas circulation circuit may preferentially extend in a sinusoidal, or coil, shape from the first end to the second end, the amplitude of the sinusoidal waves being optionally regular. Alternatively, other shapes are possible.

According to a first embodiment of the invention, said at least one upper gas superheating end plate and/or said at least one lower gas superheating end plate may be respectively positioned between the upper clamping plate and the upper end plate, and between the lower clamping plate and the lower end plate.

In particular, the gas superheating end plate(s) may be positioned between two electrical insulation plates, particularly made of mica.

According to a second embodiment of the invention, said at least one upper gas superheating end plate and/or said at least one lower gas superheating end plate may be respectively formed by the upper end plate and the lower end plate, which include a gas circulation circuit from a first end, where the gases to be heated arrive, to a second end, where the heated gases are discharged to the stack.

Each gas superheating system may then include at least one closing plate, particularly two closing plates on either side of the upper gas superheating end plate and/or the lower gas superheating end plate, to close the gas circulation circuit.

Preferentially, said at least one closing plate may be made of the same metal as the upper gas superheating end plate and/or the lower gas superheating end plate, but the metals used may also be different.

For example, said at least one closing plate and/or the upper gas superheating end plate and/or the lower gas superheating end plate may be made of an iron-chromium alloy, for example of a Crofer® 22 APU type alloy, of Inconel 600 steel, of 310S stainless steel, inter alia. Said at least one closing plate may for example be made of 310S stainless steel and the upper gas superheating end plate and/or the lower gas superheating end plate may be made of Inconel 600.

Furthermore, the upper gas superheating end plate and/or the lower gas superheating end plate may be manufactured by additive manufacturing. In this case, said at least one closing plate may not be present.

Moreover, the gas superheating system may further include at least one output duct for recovering the gases at the SOEC/SOFC-type solid oxide stack output.

Furthermore, each clamping plate of the clamping system may include at least one clamping orifice, the clamping system further including:
  at least one clamping rod intended to extend through a clamping orifice of the upper clamping plate and through a corresponding clamping orifice of the lower clamping plate to enable the assembly of the upper and lower clamping plates with one another,
  clamping means at the level of each clamping orifice of the upper and lower clamping plates intended to engage with said at least one clamping rod to enable the assembly of the upper and lower clamping plates with one another,
  optionally at least one electrical insulation plate intended to be situated between the SOEC/SOFC-type solid oxide stack and at least one of the upper and lower clamping plates.

Moreover, the invention also relates, according to a further of the aspects thereof, to a method for manufacturing at least one system for superheating the gases at the input of a SOEC/SOFC-type solid oxide stack of an assembly as defined above, characterised in that it includes the step of machining a lower gas superheating end plate and/or an upper gas superheating end plate to form a gas circulation circuit.

The method may further include the step consisting of mounting, by means of a transparent laser welding method, a closing plate on the circulation circuit of the lower gas superheating end plate and/or the upper gas superheating end plate, particularly two closing plates on either side of the lower gas superheating end plate and/or the upper gas superheating end plate.

The assembly and the manufacturing method according to the invention may include any one of the features listed in the description, taken in isolation or according to any technically possible combinations with other features.

BRIEF DESCRIPTION OF THE DRAWINGS

The invention may be understood more clearly on reading the following detailed description of non-limiting embodiment examples thereof, as well as on examining the schematic and partial figures of the appended drawing, wherein.

Throughout these figures, identical references may denote identical or equivalent elements.

Furthermore, the different parts represented in the figures are not necessarily on a uniform scale, in order to render the figures more readable.

DETAILED DESCRIPTION OF PARTICULAR EMBODIMENTS

FIGS. 1 to 4 have already been described above in the section relating to the state of the related art and the technical context of the invention. It is specified that, for FIGS. 1 and 2, the symbols and arrows in respect of the supply of steam $H_2O$, distribution and recovery of dihydrogen $H_2$, oxygen $O_2$, air and electric current, are shown for purposes of clarity and precision, to illustrate the operation of the devices represented.

Furthermore, it should be noted that all the constituents (anode/electrolyte/cathode) of a given electrochemical cell are preferentially ceramic. The operating temperature of a high-temperature SOEC/SOFC-type stack is moreover typically between 600 and 1000° C.

Furthermore, the optional terms "upper" and "lower" are to be understood herein to refer to the normal orientation of a SOEC/SOFC-type stack when in the configuration of use thereof.

Figure 5:
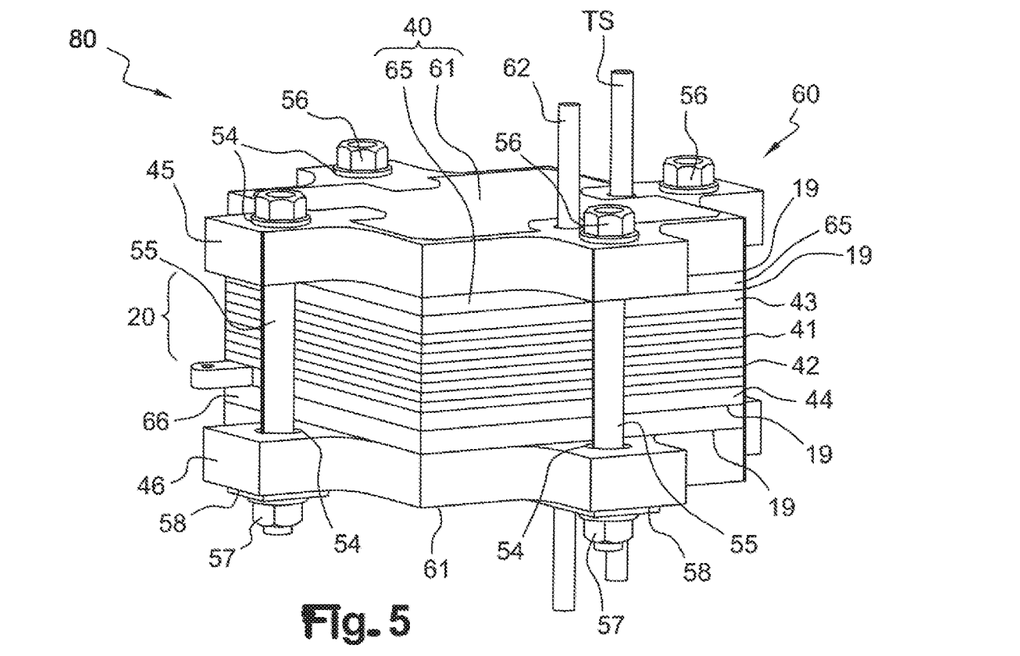
FIG. 5 represents, in a perspective view, a first example of an assembly according to the invention comprising a SOEC/SOFC-type solid oxide stack and a system for clamping the stack, further comprising two gas superheating systems, in the upper position and in the lower position respectively, with the gas superheating end plate of each system set between the stack end plate and the clamping plate.

With reference to FIG. 5, a first example has been illustrated of an assembly 80 comprising a SOEC/SOFC-type solid oxide stack 20 according to the invention and a clamping system 60, further comprising two gas superheating systems 40, in the upper position and in the lower position respectively, with the gas superheating end plate 65, 66 of each system set between the stack end plate 43, 44 and the clamping plate 45, 46.

Figure 6:
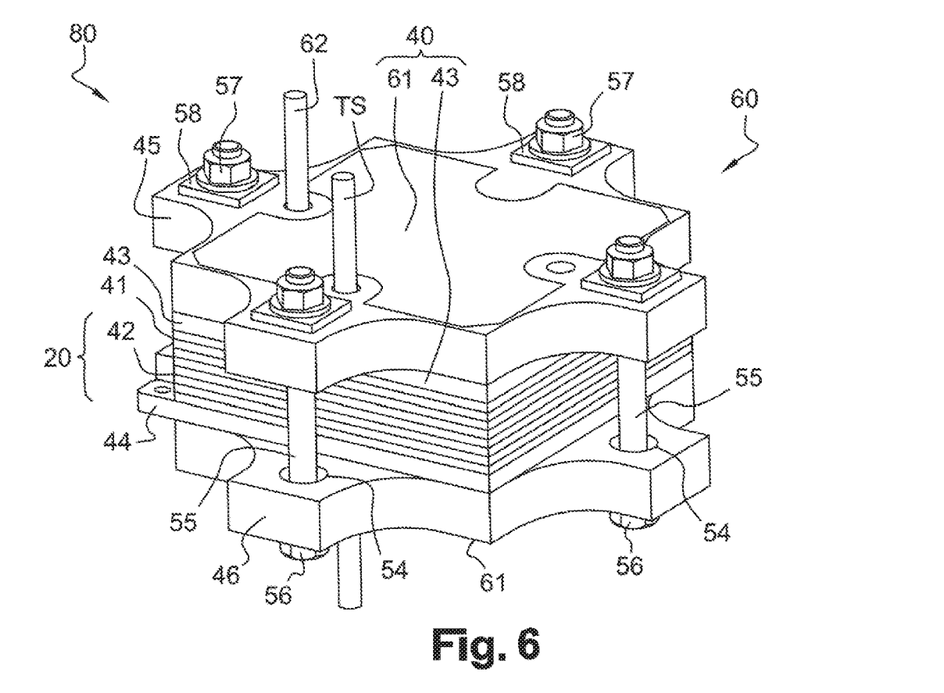
FIG. 6 represents, in a perspective view, a second example of an assembly according to the invention comprising a SOEC/SOFC-type solid oxide stack and a system for clamping the stack, further comprising two gas superheating systems, in the upper position and in the lower position respectively, with the gas superheating end plate of each system integrated in the stack end plate design.
Figure 7:
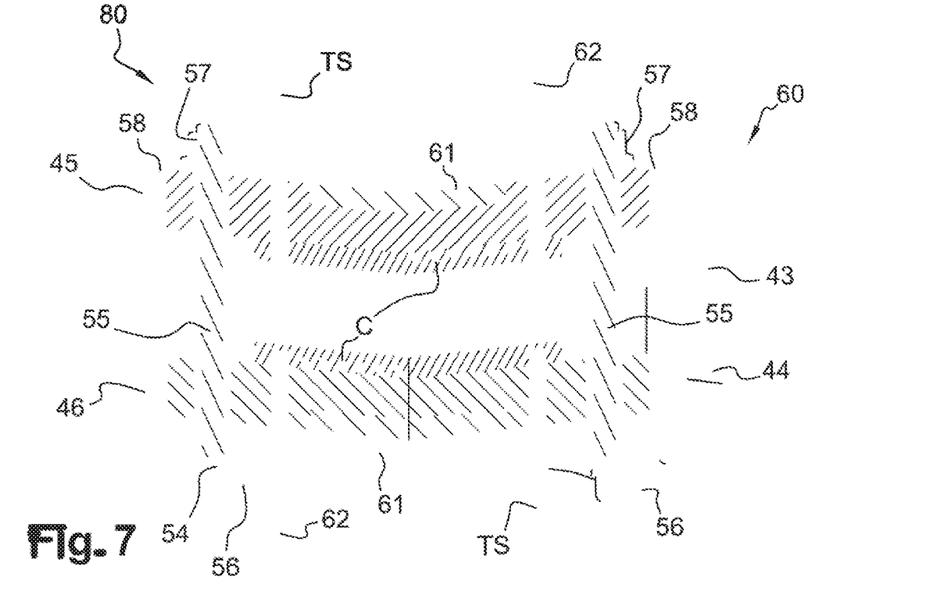
FIGS. 7 and 8 are partial perspective and cross-sectional views of the second example of an assembly in FIG. 6, without the presence of the stack.
Figure 8:
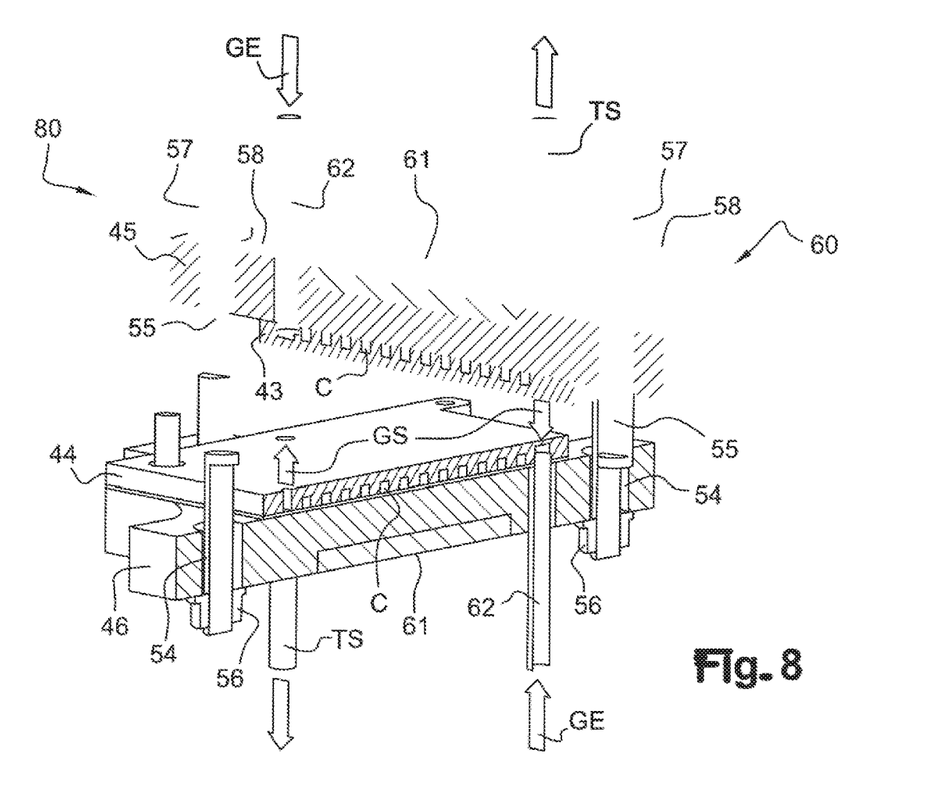

Moreover, with reference to FIGS. 6, 7 and 8, a second example has been illustrated of an assembly 80 comprising a SOEC/SOFC-type solid oxide stack 20 according to the invention and a clamping system 60, further comprising two gas superheating systems 40, in the upper position and in the lower position respectively, with the gas superheating end plate 43, 44 corresponding to the stack end plate 43, 44.

In other words, it is therefore possible to implement the invention according to these two embodiments: the first, wherein the gas superheating end plate 65, 66 is pressed between a clamping plate 45, 46 and a stack end plate 43, 44; the second, wherein the gas superheating end plate corresponds directly to a stack end plate 43, 44, the gas circulation circuit, a single-channel circuit, being integrated in this stack end plate 43, 44.

Each superheating system 40 makes it possible to heat the gases at the input of the SOEC/SOFC-type stack 20 associated with a furnace 10, as described above with reference to FIG. 3.

Among the various heat transfer modes in the area of the furnace 10, the predominant mode at these temperature levels, i.e. between 650 and 800° C., corresponds to radiant heat exchanges due to radiation. The other transfer mode is then thermal conduction, and this is used by the invention as it has the advantage of creating less external heat loss. It consists of the heat transfer mode induced by a difference in temperature between two regions of the same medium or between two media in contact without appreciable material displacement. The use of heating plates 61, as described hereinafter, for the superheating systems 40 makes it possible to recover the thermal conduction and raise the gases to the correct temperature. Thus, the gases circulating in the gas circulation circuit are heated by means of a heating plate 61 by thermal conduction.

Advantageously, the assembly 80 according to the invention has a similar structure to that of the assembly described in the French patent application FR 3 045 215 A1, apart from the presence herein of a gas superheating system, i.e. the stack 20 has a Plug & Play (PnP) feature.

Also, in a manner common to both embodiments of the invention, and as seen in FIGS. 5 to 8, each assembly 80 includes a SOEC/SOFC-type solid oxide stack 20 operating at high temperature.

This stack 20 includes a plurality of electrochemical cells 41 each formed of a cathode, an anode and an electrolyte inserted between the cathode and the anode, and a plurality of intermediate interconnectors 42 each arranged between two adjacent electrochemical cells 41, This assembly of electrochemical cells 41 and intermediate interconnectors 42 may also referred to as "stack".

Furthermore, the stack 20 includes an upper end plate 43 and a lower end plate 44, respectively also referred to as upper stack end plate 43 and lower stack end plate 44, between which the plurality of electrochemical cells 41 and the plurality of intermediate interconnectors 42 are clamped, i.e. between which the stack is situated.

Moreover, the assembly 80 also includes a system 60 for clamping the SOEC/SOFC-type solid oxide stack 20, including an upper clamping plate 45 and a lower clamping plate 46, between which the SOEC/SOFC-type solid oxide stack 20 is clamped, Each clamping plate 45, 46 of the clamping system 60 includes four clamping orifices 54.

Furthermore, the clamping system 60 includes four clamping rods 55 extending through a clamping orifice 54 of the upper clamping plate 45 and through a corresponding clamping orifice 54 of the lower clamping plate 46 to enable the assembly of the upper 45 and lower 46 clamping plates with one another.

The clamping system 60 further includes clamping means 56, 57, 58 at the level of each clamping orifice 54 of the upper 45 and lower 46 clamping plates engaging with the clamping rods 55 to enable the assembly of the upper 45 and lower 46 clamping plates with one another.

More specifically, the clamping means include, at the level of each clamping orifice 54 of the upper clamping plate 45, a first clamping nut 56 engaging with the corresponding clamping rod 55 inserted through the clamping orifice 54. Furthermore, the clamping means include, at the level of each clamping orifice 54 of the lower clamping plate 46, a second clamping nut 57 associated with a clamping washer 58, engaging with the corresponding clamping rod 55 inserted through the clamping orifice 54. The clamping washer 58 is situated between the second clamping nut 57 and the lower clamping plate 46.

Moreover, according to the invention, the assembly 80 further includes an upper gas GS superheating system 40 and a lower gas GS superheating system at the input of the SOEC/SOFC-type solid oxide stack 20.

Each upper or lower superheating system 40 includes a heating plate 61 integrated in the thickness of the upper 45 or lower 46 clamping plate so as to enable the heating of the gases to be heated GE.

Furthermore, each supper or lower superheating system 40 includes an upper or lower gas superheating end plate. The upper gas superheating end plate 65, 43 is positioned between the upper clamping plate 45 and the SOEC/SOFC-type solid oxide stack 20, the lower gas superheating plate 66, 44 is positioned between the lower clamping plate 46 and the SOEC/SOFC-type solid oxide stack 20.

More specifically, with reference to FIG. 5, the first embodiment envisages that the gas superheating end plate 65, 66 is independent from the stack end plate 43, 44.

Thus, the upper gas superheating end plate 65 is situated between the upper end plate 45 and the upper stack end plate 43. Similarly, the lower gas superheating end plate 66 is situated between the lower clamping plate 46 and the lower stack end plate 44.

Advantageously, each gas superheating end plate 65, 66 is set between two electrical insulation plates 59, made of mica. These electrical insulation plates 59 act as electrical insulation shims. In the absence thereof, the clamping system being preferentially metallic, it would induce a general short-circuit between the top and the bottom of the stack 20.

On the other hand, with reference to FIGS. 6 to 8, the second embodiment envisages that the gas superheating end plate corresponds to the stack end plate 43, 44. In other words, the gas circulation circuit C is formed in the usual stack end plate 43, 44.

This type of stack end plate 43, 44 conventionally has two functions: sandwiching the stack; receiving the stack input/output ducts, as well as the thermocouples, particularly at the level of the lower stack end plate 44.

Thus, the second embodiment of the invention adds thereto the function of using this plate for superheating the gases at the stack input.

It should that each stack end plate 43, 44 and/or each gas superheating end plate 65, 66 may be made for example of high-temperature ferritic stainless steel, such as Crofer® 22 APU.

In the two embodiments, respectively according to FIG. 5 and according to FIGS. 6 to 8, the upper gas superheating end plate 43 or 65 is identical to the lower gas superheating end plate 44 or 66. However, it could be otherwise. The geometry of the plates may be modified according to needs but their operating principle remains the same.

Figure 9:
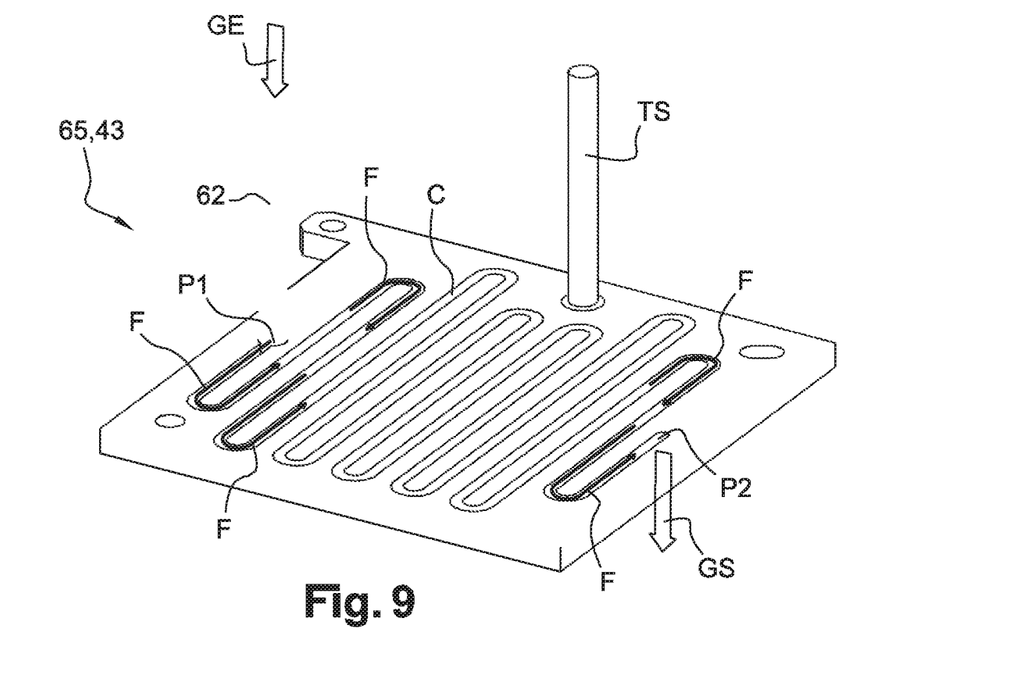
FIG. 9 represents, in a perspective view, an example of a gas superheating end plate of an assembly according to the invention, optionally separate from the stack end plate as according to the example in FIG. 5 or integrated in the stack end plate as according to the example in FIG. 6.

Thus, as seen particularly in FIGS. 8 and 9, the gases to be heated GE enter an input duct 62 and reach the first end P1 of a single-channel gas circulation circuit C of the gas superheating end plate 65, 43. FIG. 9 represents the upper gas superheating end plate 65 or 43 but the principle is the same for the lower gas superheating end plate 66 or 44.

Once at the level of the first end P1, the gases follow the path in a sinusoidal, or coil, shape of the circulation circuit C as according to the arrows F shown in FIG. 9 until they reach the second end P2 where the heated gases GS, via the heating plate 61, are discharged to the stack 20. The total length travelled by the gases in the circulation circuit C, in other words the length between the first P1 and second P2 ends, is for example of the order of 2 m. By way of example, the head loss calculated with respect to this configuration is of the order of 81 mbar for a channel of 5 mm×5 mm over a length of 2 m.

As a general rule, the length of the gas circulation circuit, i.e. the total length travelled in the circulation circuit C, between the first P1 and second P2 ends, may be determined according to the nature and the velocity of the gases circulating therein, as well as the internal temperature of the tube. This length may for example be more generally between 2 and 3 m, regardless of the embodiment described.

The overall shape of the circulation circuit C, i.e. the overall shape of the enclosure wherein the circulation circuit C is contained, may be of any type, being for example square, rounded or indeed rectangular as is the case for the example in FIG. 9 with an upper gas superheating end plate 43 or 65 also of rectangular shape.

The circulation circuit C may be obtained by machining, for example by means of a numerical control mill or any other suitable machining system in order to obtain the desired geometry. In any case, the cross-section of the single channel forming the circulation circuit C and the length thereof must be optimised to superheat the gases correctly while minimising head losses.

Moreover, as seen in FIGS. 8 and 9 in particular, each gas GS superheating system 40 includes a gas recovery output duct TS at the output of the SOEC/SOFC-type solid oxide stack 20, through the corresponding gas superheating end plate.

Furthermore, in the first embodiment of the invention according to the example in FIG. 5, no closure of the upper 65 and lower 66 gas superheating end plates is needed as two electrical insulation plates 19, made of mica, are positioned on either side of each gas superheating end plate 65 and 66, namely a plate for closing the channels of the upper and lower stack end plate, and the other plate for the electrical insulation.

The mica of the electrical insulation plates 19 is traditionally used as an electrical and thermal insulator. The thermal insulation plates 19 may preferentially have a thin layer of mica, particularly of the order of 0.8 mm. In this case, the mica may make it possible to electrically insulate the stack, without for all that forming a heat transmission barrier.

Figure 10:
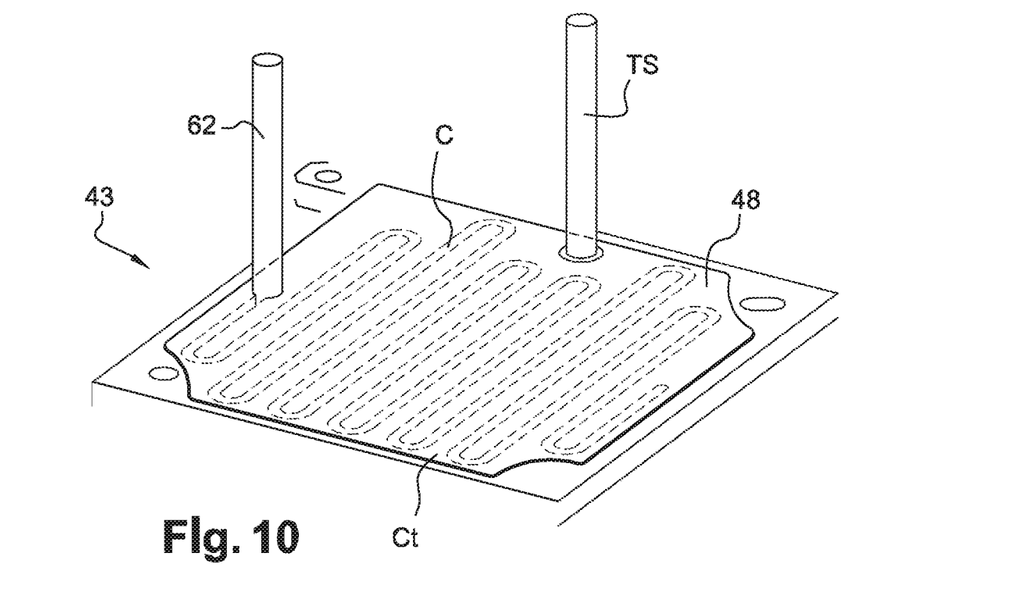
FIG. 10 represents the gas superheating end plate in FIG. 9 with the presence of a closing plate mounted by laser welding.

On the other hand, in the second embodiment of the invention according to the example in FIGS. 6 to 8, each superheating system 40 includes at least one closing plate 48 particularly two closing plates 48 on either side of the gas superheating end plate 43 or 44, to close the circulation circuit C, as seen in FIG. 10.

The closing plate(s) 48 are preferentially mounted by transparent laser welding. The laser welding technique is used for welding metals using the characteristics of laser technology: with the high energy density and fineness of the laser beam, the targeted zones start to melt and are then rapidly welded by cooling. This results in a strong weld on a reduced surface area.

As illustrated in FIG. 10, the transparent laser welding should preferentially follow the contour Ct, or laser seal line, as shown to be able to force the gases to follow the full path.

In this example in FIGS. 6 to 8, electrical insulation plates may also be envisaged to set the polarities.

Obviously, the invention is not limited to the embodiment examples described above. Various modifications may be made thereto by those skilled in the art.

What is claimed is:

1. Assembly, including:
    a SOEC/SOFC-type solid oxide stack operating at high temperature, including:
        a plurality of electrochemical cells each formed of a cathode, an anode and an electrolyte inserted between the cathode and the anode, and a plurality of intermediate interconnectors each arranged between two adjacent electrochemical cells,
        an upper end plate and a lower end plate, between which the plurality of electrochemical cells and the plurality of intermediate interconnectors are clamped,
    a system for clamping the SOEC/SOFC-type solid oxide stack, including an upper clamping plate and a lower clamping plate, between which the SOEC/SOFC-type solid oxide stack is clamped, wherein it further includes:
    a system for superheating the gases at the input of the SOEC/SOFC-type solid oxide stack, including:
        at least one heating plate integrated in the thickness of at least one of the upper and lower clamping plates suitable for heating the gases to be heated,
        at least one upper gas superheating end plate, positioned between the upper clamping plate and the SOEC/SOFC-type solid oxide stack, and/or a lower gas superheating end plate, positioned between the lower clamping plate and the SOEC/SOFC-type solid oxide stack, each gas superheating end plate including a gas circulation circuit from a first end, where the gases to be heated arrive, to a second end, where the heated gases are discharged towards the stack,
        at least one input duct of the gases to be heated communicating with the first end of a gas superheating end plate, such that a stream of gas to be heated entering said at least one input duct circulates in the gas circulation system, from the first end to the second end to reach the input of the SOEC/SOFC-type solid oxide stack.

2. Assembly according to claim 1, wherein the gas circulation circuit extends in a sinusoidal shape from the first end to the second end.

3. Assembly according to claim 1, wherein said at least one upper gas superheating end plate and/or said at least one lower gas superheating end plate are respectively positioned between the upper clamping plate and the upper end plate, and between the lower clamping plate and the lower end plate.

4. Assembly according to claim 3, wherein the gas superheating end plate(s) are positioned between two electrical insulation plates.

5. Assembly according to claim 1, wherein said at least one upper gas superheating end plate and/or said at least one lower gas superheating end plate are respectively formed by the upper end plate and the lower end plate, which include a gas circulation circuit from a first end, where the gases to be heated arrive, to a second end, where the heated gases are discharged to the stack.

6. Assembly according to claim 5, wherein each gas superheating system includes two closing plates on either side of the upper gas superheating end plate and/or the lower gas superheating end plate, to close the gas circulation circuit.

7. Assembly according to claim 1, wherein the gas superheating system further includes at least one output duct for recovering the gases at the SOEC/SOFC-type solid oxide stack output.

8. Assembly according to claim 1, wherein each clamping plate of the clamping system includes at least one clamping orifice the clamping system further including:
    at least one clamping rod intended to extend through a clamping orifice of the upper clamping plate and through a corresponding clamping orifice of the lower clamping plate to enable the assembly of the upper and lower clamping plates with one another,
    clamping means at the level of each clamping orifice of the upper and lower clamping plates intended to engage with said at least one clamping rod to enable the assembly of the upper and lower clamping plates with one another,
    at least one electrical insulation plate intended to be situated between the SOEC/SOFC-type solid oxide stack and at least one of the upper and lower clamping plates.

9. Method for manufacturing at least one system for superheating the gases at the input of a SOEC/SOFC-type solid oxide stack of an assembly according to claim 1, wherein it includes the step of machining a lower gas superheating end plate and/or an upper gas superheating end plate to form a gas circulation circuit.

10. Method according to claim 9, wherein it includes the step consisting of mounting, by means of a transparent laser welding method, two closing plates on the circulation circuit on either side of the lower gas superheating end plate and/or the upper gas superheating end plate.

* * * * *